United States Patent
Rainish (10) Patent No.: US 11,838,096 B2
(45) Date of Patent: Dec. 5, 2023

(54) SYSTEM AND METHOD FOR REGENERATIVE SATELLITE COMMUNICATIONS

(71) Applicant: SATIXFY ISRAEL LTD., Rehovot (IL)

(72) Inventor: Doron Rainish, Ramat Gan (IL)

(73) Assignee: SATIXFY ISRAEL LTD., Rehovot (IL)

( * ) Notice: Subject to any disclaimer, the term of this patent is extended or adjusted under 35 U.S.C. 154(b) by 9 days.

(21) Appl. No.: 16/763,499

(22) PCT Filed: Oct. 29, 2018

(86) PCT No.: PCT/IL2018/051155
§ 371 (c)(1),
(2) Date: May 12, 2020

(87) PCT Pub. No.: WO2019/092694
PCT Pub. Date: May 16, 2019

(65) Prior Publication Data
US 2020/0322042 A1    Oct. 8, 2020

(30) Foreign Application Priority Data

Nov. 12, 2017    (IL) .......................................... 255600

(51) Int. Cl.
*H04B 7/185*    (2006.01)
*H04W 88/16*    (2009.01)

(52) U.S. Cl.
CPC ..... *H04B 7/18513* (2013.01); *H04B 7/18515* (2013.01); *H04B 7/18582* (2013.01); *H04W 88/16* (2013.01)

(58) Field of Classification Search
CPC .................................................. H04B 7/18513
See application file for complete search history.

(56) References Cited

U.S. PATENT DOCUMENTS 6,157,642 A    12/2000    Sturza
6,463,040 B1    10/2002    Dutta
(Continued)

FOREIGN PATENT DOCUMENTS

CN    101868054 A    10/2010
CN    103117796 A    5/2013
(Continued)

OTHER PUBLICATIONS

"Implementation and Testing of the Protected Tactical Waveform (PTW)" by Brian J. Wolf, Jacob C. Huang, Milcom 2015 Track 4, pp. 181-186 (Year: 2015).*
(Continued)

*Primary Examiner* — Edan Orgad
*Assistant Examiner* — Won Tae C Kim
(74) *Attorney, Agent, or Firm* — BROWDY AND NEIMARK, P.L.L.C.

(57) ABSTRACT

A system and method for regenerative satellite communications between a gateway of a terrestrial communication network and a user terminal via a communications satellite are described. The system includes a distributed regenerative modulator having a first portion of modulator components arranged at the gateway, and a second portion of modulator components arranged at the communications satellite. The first portion of the modulator components applies a first part of modulation functions to the information data carried by an uplink signal at the gateway, while the second portion of the modulator components applies a second part of modulation functions to the information data at the satellite to generate a down-link signal for transmitting it to the user terminal. The first portion of the components performs specific signal processing operations, which are only suitable for processing a waveform of a specific type. The second portion of the components performs only gen- (Continued)

eral signal processing operations which do not depend on the waveform used for modulation.

21 Claims, 7 Drawing Sheets

(56) References Cited

U.S. PATENT DOCUMENTS

| | | | | |
|---|---|---|---|---|
| 8,832,534 | B1* | 9/2014 | Dave | H03M 13/1111 |
| | | | | 714/780 |
| 10,312,940 | B2* | 6/2019 | Muhammad | H04L 27/34 |
| 2007/0004422 | A1 | 1/2007 | Talaie et al. | |
| 2010/0128661 | A1 | 5/2010 | Becker et al. | |
| 2012/0294230 | A1 | 11/2012 | Dankberg et al. | |
| 2013/0322511 | A1* | 12/2013 | Varma | H04L 27/2689 |
| | | | | 375/230 |
| 2014/0082675 | A1 | 3/2014 | Kim et al. | |
| 2016/0037434 | A1* | 2/2016 | Gopal | H04L 45/02 |
| | | | | 370/316 |
| 2017/0149493 | A1* | 5/2017 | Arapoglou | H04B 7/0626 |
| 2017/0324468 | A1* | 11/2017 | Lee | H04B 7/18543 |

FOREIGN PATENT DOCUMENTS

| | | |
|---|---|---|
| EP | 2897307 A1 | 7/2015 |
| FR | 3042930 A1 | 4/2017 |
| WO | 2004073229 A2 | 8/2004 |
| WO | 2007000794 A1 | 1/2007 |

OTHER PUBLICATIONS

EBU, "Digital Video Broadcasting (DVB); Second generation framing structure, channel coding and modulation systems for Broadcasting, Interactive Services, News Gathering and other broadband satellite applications; Part 1: DVB-S2", ETSI EN 302 307-1 pp. 1-80 (Jul. 2014).

EBU, "Digital Video Broadcasting (DVB); Second generation framing structure, channel coding and modulation systems for Broadcasting, Interactive Services, News Gathering and other broadband satellite applications", ETSI EN 302 307-2 V1.1.1, pp. 1-135 (Feb. 2015).

LTE, "Evolved Universal Terrestrial Radio Access (E-UTRA); LTE physical layer; General description", ETSI TS 136 201 V14.1.0, pp. 1-17 (Apr. 2017).

Mauro Marinelli et al., "A Regenerative Payload for Satellite Multimedia Communications" Satellite Systems, IEEE Multimedia, pp. 30-37 (1999).

* cited by examiner

SYSTEM AND METHOD FOR REGENERATIVE SATELLITE COMMUNICATIONS

TECHNOLOGICAL FIELD

This invention relates generally to systems and methods for satellite communications, and in particular, to regenerative satellite communication payloads.

BACKGROUND ART

References considered to be relevant as background to the presently disclosed subject matter are listed below:

U.S. Pat. No. 5,848,060 describes a satellite communications system that employs a multiple element antenna for receiving signals on a first frequency band and relaying the signals to a ground station on a second frequency band. The system includes a downconvertor for converting signals received at each of the multiple antenna elements on the first frequency band to corresponding baseband signals, and a multiplexor for time-division multiplexing the corresponding baseband signals to form a multiplexed sample stream. The system also includes a modulator for modulating a carrier in the second frequency band with the multiplexed sample stream and transmitting the modulated carrier to the ground station. The satellite relays signals received from the ground station using a demultiplexor in a similar manner.

U.S. Pat. Appl. Publication No. 2012/0294230 describes systems, devices, processors, and methods for the transmission and reception of broadband signals between a gateway and subscriber terminals via satellite. A wireless signal is generated and transmitted including a series of frames including a physical layer header and payload. A sub-channel identifier may be included in the physical layer header to identify the sub-channel for the payload, and allow for various novel filtering techniques at the subscriber terminal. The frames may be generated to be of substantially equal duration.

U.S. Pat. No. 6,157,642 describes a data communication system for a constellation of low-Earth orbit (LEO) satellites that employ Earth-fixed cellular beam management technology. The data to be communicated is formed into data packets by a transmitting ground terminal. Each data packet includes a header and a payload. The header contains address and other control information and the payload contains the data to be communicated.

Acknowledgement of the above references herein is not to be inferred as meaning that these are in any way relevant to the patentability of the presently disclosed subject matter.

BACKGROUND

A typical digital satellite communication system includes a number of gateways (earth stations), connected to the terrestrial network (e.g., Internet, Public Data Network (PDN), Public Switch Telephony Network (PSTN), etc.). The network of gateways is connected via a communications satellite to many user terminals. The communications satellite includes a payload that has all the components that provide communication services to receive, process, amplify and retransmit information.

Specifically, in a forward link, a communications payload receives desired uplink carriers transmitted by earth stations in the desired frequency bands and with the desired polarization, and from the desired region on the surface of the earth (service zone). The payload should receive as little interference as possible from other frequency bands, polarizations, and regions. During processing, the payload converts the frequencies of all received uplink carriers to the appropriate downlink frequencies. Frequency conversion is required to prevent the high power downlink transmission from interfering with the weak signals received on the uplink. The payload amplifies the received carriers to a level suitable for retransmission to the user terminals, while limiting noise and distortion as much as possible, and then transmits the downlink carriers with the desired polarization to the user terminals located at the appropriate service zone. When required, a backward (i.e., return) link may also be implemented, mutatis mutandis.

Satellite communications payloads can be of either transparent type or regenerative type.

Figure 1:
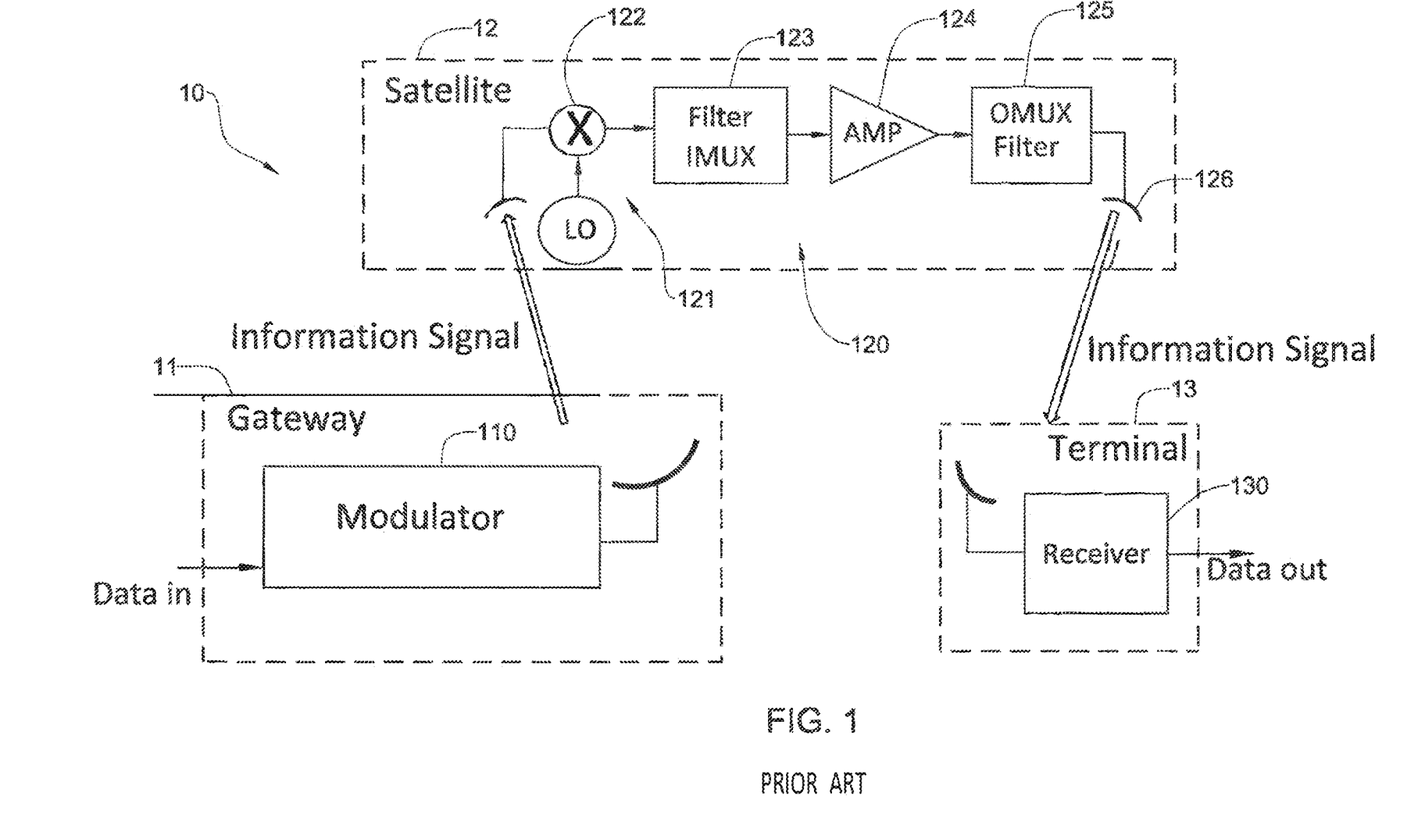
FIG. 1 illustrates a simplified block diagram of a communication system with a conventional transparent payload.

A simplified block diagram of a communication system 10 for satellite payload communications with a conventional transparent (also known as "bent-pipe") payload is shown in FIG. 1. The system 10 includes a modulator 110 arranged at a gateway 11, a transparent repeater 120 arranged at a satellite 12 and a receiver 130 arranged at a user terminal 13.

The modulator 110 is configured for modulating information data and generating a broadband uplink signal transmitted from the gateway 11 to the satellite 12. It should be understood that other operations, such as multiplexing, amplification, etc., may also be applied to the information data during processing at the gateway 11.

Generally, the transparent repeater 120 includes a frequency converter 121 that ensures decoupling between the input and the output of the repeater. This is accomplished by a mixer 122 and a local oscillator (LO) according to the heterodyne principle. Multiplication of the uplink signal and the sinusoidal LO signal results in frequencies at both the sum and difference frequencies of the two signals. The undesired frequencies are filtered out at a later stage.

To overcome intermodulation distortion between carriers while providing the maximum possible amplification, the overall bandwidth of the repeater can be split into several sub-bands (channels). In the multichannel system shown in FIG. 1, an input multiplexer (IMUX) 123 is employed to split the overall bandwidth into a plurality of sub-bands. The IMUX 123 can include a set of band-pass filters to separate the different carriers at the input and prevent intermodulation distortion between the carriers, while providing the maximum possible amplification. The equipment that operates on a single sub-band is known as a transponder or a channel.

Each channel includes a high-power amplifier 124 to increase the power of the weak uplink signal. Amplified carriers from a group of channels can be recombined in the output multiplexer (OMUX) 125. The combined signal is then sent to the downlink antenna 126 for retransmission to the receiver 130 of the user terminal 13.

It should be understood that the transparent repeater 120 may also include other conventional components (not shown), such as a low-noise amplifier to perform amplification of the uplink signal, filters to reduce out-of-band frequency components, a limiter to prevent saturation, a linearizer to minimize distortion of the signal, etc.

The transparent repeater 120 relays to the receiver 130 any radio signal it receives within its bandwidth, regardless of what type of information the signal is carrying. The transparent payload transmits the same waveform that it receives, albeit on a different carrier frequency. Thus, the data transmitted through the uplink signal from the gateway to the satellite are identical to those transmitted to the terminals over the downlink signal. This means that any noise, interference and other degradation present in the received uplink signal are also present in the transmitted downlink signal. As a result, the signal received by the user terminal contains degradation introduced during both the uplink and the downlink.

Furthermore, in the transparent payload, a bandwidth of the uplink signal is identical to the bandwidth downlink Therefore, when the desired bandwidth of the downlink signal allocated to the user terminal traffic is wide, and when the gateway serves a large number of terminals, in a plurality of beams, as is the case for High Throughput Satellites (HTS), several transmitters might be required at the gateway, to cover it.

However, usually, communication traffic, and the uplink and downlink bandwidths are asymmetric, namely, the signals exchanged with the gateway have a larger signal to noise ratio and are more immune to interference than the signals exchanged with the terminals. Consequently, more spectrally efficient waveforms are desired for the uplink between the gateway and the satellite than for the downlink between the satellite and the user terminals.

This can be achieved by a regenerative payload, which, at the satellite side, has additional functions, such as demodulation, baseband signal processing that may include decoding the information data received from the gate, re-encoding, switching, and further modulating the data according to the waveform that is suitable for the receivers at the user terminal end.

Figure 2:
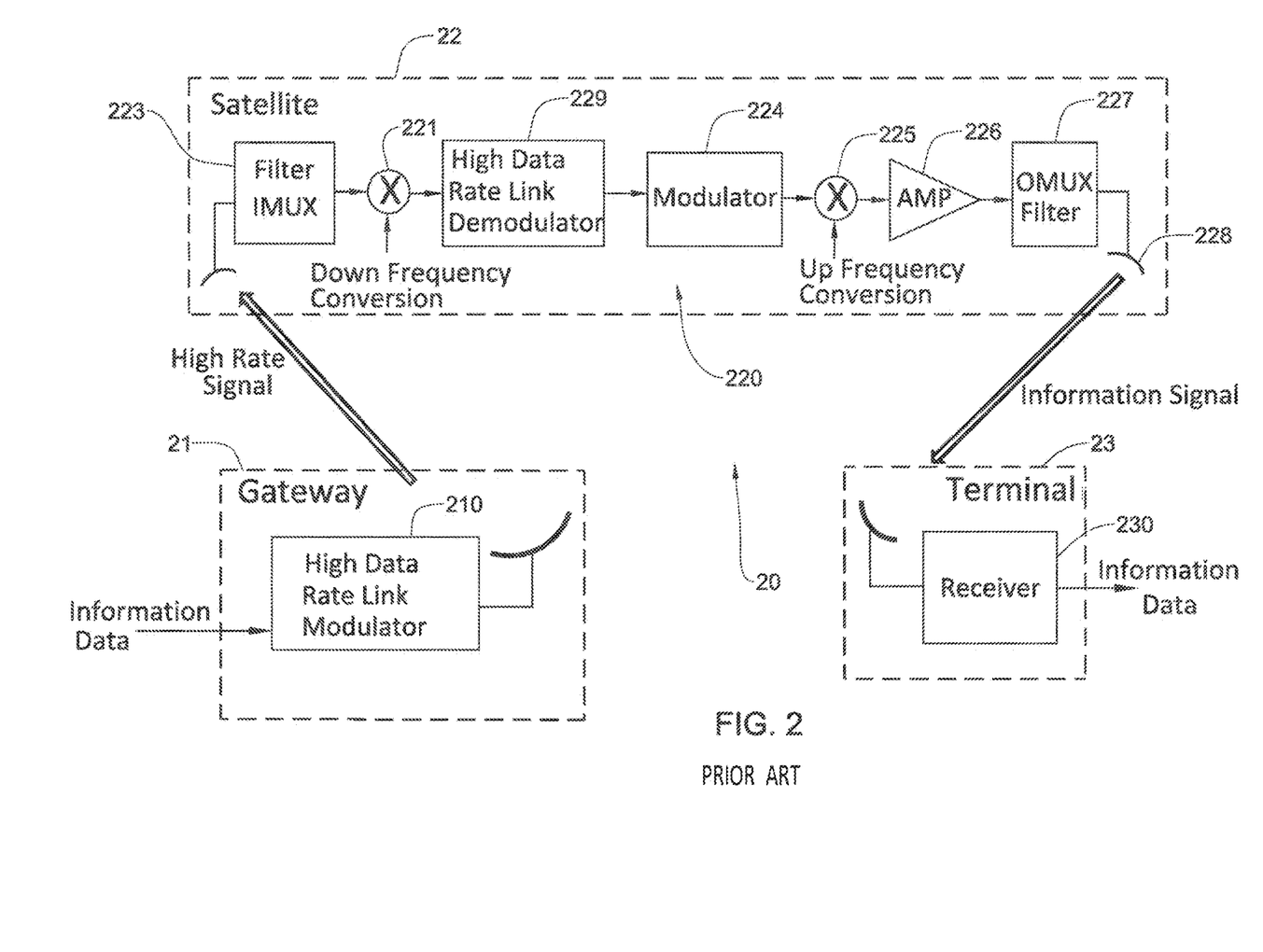
FIG. 2 illustrates a simplified block diagram of a communication system with a conventional regenerative payload.

A simplified block diagram of a multichannel communication system 20 for satellite payload communications with a conventional regenerative payload is shown in FIG. 2. The communication system 20 includes a high data rate link modulator 210 (i.e., modulator for high data rate link communication) arranged at a gateway 21, a regenerative repeater 220 (also known as "on-board processing repeater") arranged at a communications satellite 22 and a receiver 230 arranged at a user terminal 23.

In the multichannel communication system 20, the regenerative repeater 220 includes an input multiplexer (IMUX) 223 configured to split the uplink signal into several subbands (channels), a frequency down-converter 221 configured to down-convert the uplink signal to an intermediate frequency (IF) and a high data rate link demodulator 229 that demodulates the IF signal and switches it to baseband. The individual pulses are detected and decoded into information bits. These information bits are then re-modulated into a downlink carrier signal by a modulator 224, up-converted by a frequency up-converter 225 and amplified by a high-power amplifier 226 before retransmission to the receiving user terminal 23. The amplified carriers from a group of channels are recombined in an output multiplexer (OMUX) 227. The combined signal is then sent to a downlink antenna 228 for retransmission to the receiver 230 of the user terminal 23.

In a regenerative payload, the uplink waveform is not identical to the downlink waveform. The uplink uses the high data rate modulator 210 at the gateway 21 and the high data rate demodulator 229 at the communications satellite 22 capable of demodulating the uplink signal to recover the information data. The information data can be carried over the high data rate with higher spectral efficiency in the uplink, than in the downlink transmitted to the user terminal, thus reducing the total spectral requirement.

Unlike the transparent repeater payload shown in FIG. 1, the regenerative type payload system 20 demodulates the uplink signal to recover the symbols encoded in the baseband signal, and then digitally decodes to determine the actual data bits carried thereby. Thereafter, the regenerative type payload systems form the downlink signals by re-encoding and re-modulating the recovered data bits to produce a downlink signal that has a different bandwidth and/or data rate than the uplink signal to be suitable for the user terminal. For example, the total bandwidth required for the uplink signal can be narrower than the bandwidth on the downlink. Such a bandwidth on the uplink of a regenerative payload can be narrower than the bandwidth required in a transparent payload. Therefore, the regenerative architecture can be more easily implemented by using only a single transmitter at the gateway than in the case of a transparent communication payload, where a plurality of transmitters might be required at the gateway to cover the entire wide bandwidth. The effectivity of the regenerative payload can be even larger in a case of multi-beam satellite (also known as HTS—High Throughput Satellite), where the gateway link should support a plurality of user links.

Furthermore, regenerative repeaters offer improved performance compared with transparent repeaters, because degradation, which occurs in the uplink signal, is not retransmitted in the downlink.

However, regenerative payloads, unlike transparent payloads, are highly dependent on the transmission waveform. The regenerative repeaters must thus be designed to handle predetermined data formats, making them less flexible than transparent repeaters which can relay any signal, regardless of the kind of information the uplink signal is carrying. In addition, they are more complex and therefore less reliable, more costly, and usually require more electrical power to operate.

GENERAL DESCRIPTION

Satellites are nowadays designed and built with a fifteen-year in-orbit expected lifetime. Fifteen years correspond to several generations of evolution of software, hardware, data coding standards and communication protocols. Payload hardware in an Earth orbit cannot be serviced, repaired or replaced after launch, hence reliability is paramount. Transparent payload architectures do not include modulation/demodulation functions on board, and therefore are by definition able to cope with evolving modulations, protocols and formats, provided that operating frequencies and channel bandwidths are not drastically modified. On the other hand, since regenerative repeaters include, at the satellite, all components of the demodulator, decoder, encoder and modulator, a satellite launched today may become technologically obsolete, and therefore inadequate for advanced communication techniques and any new service needs that may be introduced in the future.

Accordingly, there is still a need in the art for further improvement of the regenerative payloads in order to render them more reliable and flexible to allow for upgrades of hardware, software, modulation schemes, communication standards and protocols.

The present invention revitalizes regenerative payloads by overcoming technical obsolescence and/or lack of adaptability to evolving communication techniques.

The concept of the invention is based on the following main principles:

(i) Digital communication systems can be composed of two basic portions.

One portion of each digital communication system is a generic portion. The generic portion may include only "general-purpose" components that perform only common signal processing operations for most of communication standards and protocols. These common signal processing operations should not be bound to the type of the waveform used for modulation. Accordingly, general-purpose components of the communication system are not expected to become outdated during an in-orbit satellite's expected lifetime.

Another portion of each digital communication system is a specific portion. The specific portion may include only "specific-purpose" components that perform only specific signal processing operations, which are only suitable for processing a waveform of a specific type and are used only in certain communication standards and protocols. Accordingly, if the type of a waveform used for communications, standards and/or protocols are/is modified, the hardware and/or software of the specific-purpose components of the communication system should be upgraded correspondingly, while the general-purpose components remain unchanged.

(ii) The present invention calls for separation of the general-purpose components, used for waveform processing, from the specific-purpose components. In particular, according to the present invention, a distributed regenerative satellite communications system is provided in which the portion of components, which includes only "specific-purpose" components, is arranged at the gateway, while the other portion of components, which includes only "general-purpose" components, is arranged at the satellite.

The split between the generic and specific portions of the communication system can, for example, be chosen such that the intermediate information between the specific portion and the generic portion can easily be compressed. Typically this place is where the signals have a low number of a discrete value and generated at a low rate, e.g., where the symbols are generated.

(iii) The specific portion and the generic portion of the communication system can be separated from the generic portion by conveying the intermediate information via another set of system components performing various operations over a communication channel.

(iv) The generic portion of a communication system can be implemented by a combination of a configurable hardware and software (typically called "software defined radio" or SDR).

Thus, according to one general aspect of the present invention, a novel system for regenerative satellite communications, between a gateway of a terrestrial communication network and a target terminal of a user, is provided. In a forward link, the system is configured for transmitting to the target terminal a downlink signal indicative of information data carried by an uplink signal received from the gateway.

According to an embodiment of the present invention, the system has a distributed regenerative communications architecture comprising a distributed modulator including a first part of components arranged at the gateway, while a second a part of components arranged at a satellite. The first portion of modulator components applies a first part of modulation functions to the information data carried by the uplink signal at the gateway. On the other hand, the second portion of modulator components applies a second part of modulation functions to the information data at the satellite, to generate said down-link signal for transmitting it to the target terminal of the user.

According to an embodiment of the present invention, the first portion of components of the distributed regenerative modulator performs only specific signal processing operations, which are different for each communication standard and protocol, and are only suitable for processing a waveform of a specific type.

According to an embodiment of the present invention, the second portion of components of the distributed regenerative modulator performs only general signal processing operations, which are common to all communication standards and protocols, and do not depend on the waveform used for modulation.

According to an embodiment of the present invention, a split of the distributed regenerative modulator into the first portion of modulator components and the second portion of modulator components is such that the complexity of compressing the intermediate information rate between the specific first portion and the second portion is minimized.

According to an embodiment of the present invention, a split of the distributed regenerative modulator into the first portion of modulator components and the second portion of modulator components is such that the intermediate information rate between the specific first portion and the second portion can be easily compressed.

According to an embodiment of the present invention, a split of the distributed regenerative modulator into the first portion of modulator components and the second portion of modulator components is in a place where signals have a low number of a discrete value and generated at a low rate.

According to an embodiment of the present invention, the system for regenerative satellite communications comprises a high data rate link communication modulator arranged at the gateway downstream of the first portion of components, and which is configured for generating the uplink signal.

According to an embodiment of the present invention, the system for regenerative satellite communications is a multichannel system. In this case, the system comprises at the satellite, an input multiplexer (IMUX) configured to split the uplink signal into several sub-bands.

According to an embodiment, each channel includes a frequency down-converter, and a high data rate link demodulator. The frequency down-converter is configured to down-convert the uplink signal into an intermediate frequency (IF) signal. The high data rate link demodulator is arranged downstream of the frequency down-converter, and is configured for demodulating the IF signal and switching it to baseband.

According to an embodiment of the present invention, for each channel, the second portion of components of the distributed regenerative modulator, that performs only general signal processing operations, is arranged downstream of the high data rate link demodulator.

According to an embodiment of the present invention, the system for regenerative satellite communications is further configured for receiving a downlink signal in a backward link from the communications satellite to the gateway. The downlink signal can be indicative of information data carried by an uplink signal received at the communications satellite from the user terminal. In this embodiment, the system further includes a high data rate link communication demodulator that is arranged at the gateway upstream of said first portion of components, and is configured for receiving a downlink signal from the satellite in the backward link According to this embodiment, the second portion of the components of the distributed regenerative demodulator is arranged upstream of said high data rate link modulator.

According to an embodiment of the present invention, the system for regenerative satellite communications comprises a DVB-S2/S2X link communication modulator arranged at the gateway downstream of the first portion of components, and is configured for generating an uplink signal. In this case, the system for regenerative satellite communications comprises at the satellite a frequency down-converter configured to down-convert the uplink signal into an intermediate frequency (IF) signal, and a DVB-S2/S2X link demodulator arranged downstream of the frequency down-converter. The DVB-S2/S2X link demodulator is configured for demodulating the IF signal and switching it to baseband.

According to an embodiment of the present invention, the second portion of the components of the distributed regenerative modulator is arranged downstream of said DVB-S2/S2X link demodulator.

According to another embodiment of the present invention, the system is configured for receiving a downlink signal in a backward link from the communications satellite to the gateway. The downlink signal is indicative of information data carried by an uplink signal received at the communications satellite from the user terminal. In this case, the second portion of the components of the distributed regenerative modulator is arranged upstream of the DVB-S2/S2X link demodulator.

According to an embodiment of the present invention, the system for regenerative satellite further comprises, at the satellite, a frequency up-converter arranged downstream of the second portion of components of the regenerative distributed modulator and a high-power amplifier. The frequency up-converter is configured for up-converting the intermediate frequency signal to a carrier frequency. The high-power amplifier is configured for amplifying the up-converted signal.

When the system for regenerative satellite communications is a multichannel system, it also includes an output multiplexer (OMUX). The output multiplexer (OMUX) is configured for recombining amplified carriers from a group of channels into the downlink signal.

According to an embodiment of the present invention, the distributed regenerative modulator operates on the basis of the DVB-S2 and/or DVB-S2X standards. According to this embodiment, the first portion of components provides, inter alia: mode adaptation, stream adaptation, forward error correction (FEC) encoding, interleaving bits and symbols, framing, providing references by pilot signals, header signaling, mapping k bits to one of $2^k$ constellation points, and scrambling. In this case, the second portion of components of DVB-S2X can provide shaping of a signal indicative of the information data.

According to an embodiment of the present invention, the distributed regenerative modulator operates on the basis of a PTW scheme.

According to an embodiment of the present invention, the distributed regenerative modulator employs the Long Term Evolution (LTE) physical layer with a downlink shared channel (DL).

The system for satellite payload communications of the present invention has many of the advantages of the prior art techniques, while simultaneously overcoming some of the disadvantages normally associated therewith.

In particular, the system of the present invention enables to utilize non-symmetric uplink and downlink. For example, the uplink may have a much larger data rate than the downlink. The system is flexible for future developments in data coding standards, since it does not require any data decoding at the satellite itself, but only mere conversion of symbols from one modulation scheme to another. Such conversions can be performed by generic modules arranged at the satellite, which are not expected to become outdated.

Critical factors in satellite payloads are the power consumption and the weight. The weight is directly influencing the launching cost. Power consumption is limited by the capability of the satellite power system including the solar panels and the batteries. A more capable satellite power system has higher weight and again requires higher launching costs. The system of the present invention reduces the number of operations to be performed at the payload thus allowing for reduced cost and reduced power implementation.

According to another general aspect of the present invention, a novel method for regenerative satellite communications between a gateway of a terrestrial communication network and a user terminal via a communications satellite is provided. The method provides transmitting, from the communications satellite to the user terminal, a downlink signal indicative of information data carried by an uplink signal received at the communications satellite from the gateway.

According to an embodiment of the present invention, the method includes providing a distributed modulator that includes a first portion of components arranged at the gateway and a second portion of components arranged at the communications satellite. According to an embodiment of the present invention, a first part of modulation functions, which are performed by the first portion of components of the distributed modulator, are applied to the information data at the gateway, and the uplink signal is generated.

The method also includes processing the uplink signal at the satellite and applying a second part of modulation functions performed by the second portion of components of the distributed modulator to the uplink signal during processing in order to generate a down-link signal indicative of the information data.

According to an embodiment of the present invention, the method includes generating the uplink signal by the high data rate link communication modulator arranged at the gateway downstream of the first portion of components.

According to an embodiment of the present invention, the method includes the following steps performed before applying of the second part of modulation functions: receiving the uplink signal at the satellite, frequency down-converting the uplink signal into an intermediate frequency (IF) signal, and demodulating the IF signal and switching it to a corresponding baseband signal indicative of the information data by a high data rate link demodulator.

According to an embodiment of the present invention, the method includes splitting the received uplink signal into several sub-bands by an input multiplexer (IMUX), and only then frequency down-converting the uplink signal for each sub-band into an intermediate frequency (IF) signal. Then the IF signal is demodulated for each sub-band by a high data rate link demodulator and switched to corresponding baseband signals indicative of the information data.

According to an embodiment of the present invention, the method also includes the following steps performed after applying of the second part of modulation functions: frequency up-converting the intermediate frequency signal to a carrier frequency. In the multichannel case, the system also includes recombining amplified carriers from a group of sub-bands into the downlink signal by an output multiplexer (OMUX).

According to an embodiment of the present invention, the first part of modulation functions includes specific operations based on the DVB-S2X standard. In this case, the specific operations include: mode adaptation, stream adaptation, forward error correction (FEC) encoding, interleaving bits and symbols, framing, providing references by pilot signals, header signaling, mapping k bits to one of $2^k$ constellation points, and scrambling.

According to an embodiment of the present invention, the first part of modulation functions includes specific operations based on the Protected Tactical Waveform (PTW) scheme. In this case, the specific operations include High-Level Data Control (HDLC) framing, bit covering, low-density parity-check (LDPC), mapping, Symbol MUX and time permutations.

According to an embodiment of the present invention, the first part of modulation functions includes specific operations based on the Long Term Evolution (LTE) physical layer with a downlink shared channel (DL). In this case, the specific operations include: scrambling, modulation mapping of scrambled bits to generate complex-valued symbols, layer mapping of the complex-valued modulation symbols onto one or several transmission layers, transform precoding to generate complex-valued symbols precoding of the complex-valued symbols, mapping of precoded complex-valued symbols to resource elements, and generation of a complex-valued time-domain OFDMA signal for each antenna port.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The principles and operation of the system for satellite payload communications according to the present invention may be better understood with reference to the drawings and the accompanying description, it being understood that these drawings and examples in the description are given for illustrative purposes only and are not meant to be limiting. The same reference numerals and alphabetic characters will be utilized for identifying those components which are common in the communications system and its components shown in the drawings throughout the present description of the invention.

Figure 3:
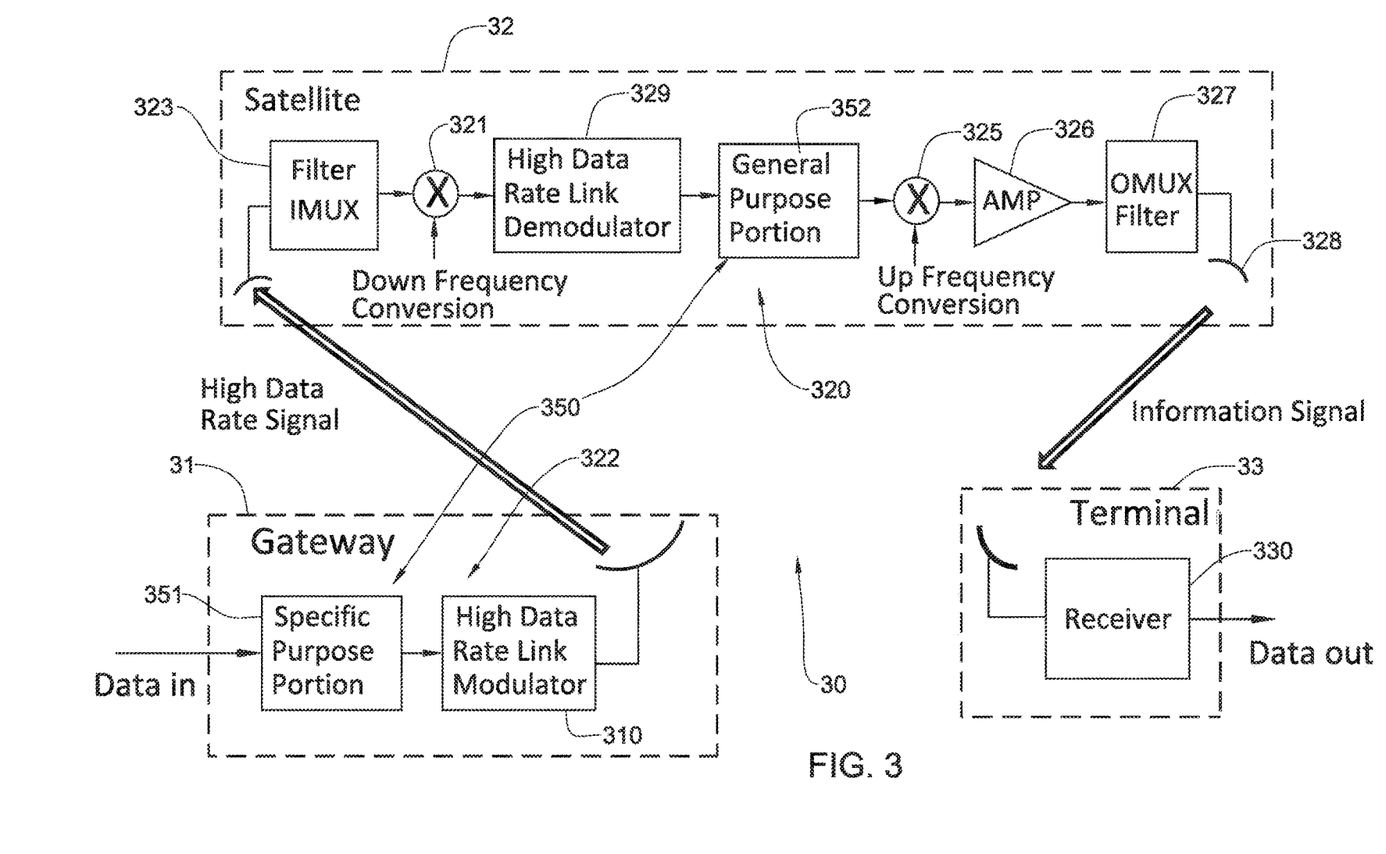
FIG. 3 illustrates a simplified block diagram of a system for satellite payload communications with a distributed regenerative payload, according to an embodiment of the present invention.

Referring to FIG. 3, a simplified block diagram of a digital communication system 30 for satellite payload communications, according to an embodiment of the present invention, is illustrated. The system 30 has a distributed regenerative communications architecture between a gateway 31 and a satellite 32 with a distributed regenerative payload.

According to this embodiment, modulation of the information data is carried out in two stages. In particular, all "specific-purpose" modulation functions to the information data carried by the uplink signal are carried out at the gateway, while "general-purpose" modulation functions to the information data are carried out on board of the satellite. The specific-purpose modulation functions include specific signal processing operations, which are only suitable for processing a waveform of a specific type, and are different for each specific communication standard and protocol. On the other hand, the general-purpose modulation functions include signal processing operations which are common to all communication standards and protocols. These common signal processing operations should not be bound to the type of the waveform used for modulation.

According to an embodiment of the present invention, the system 30 includes a distributed modulator 350 that includes two portions of components, which apply two different types of modulation functions to the information data provided for transmission by the system for satellite payload communications from the gateway to the user terminal.

A first portion 351 of the distributed modulator 350 is a specific portion. The specific portion includes "specific-purpose" components that perform only specific signal processing operations, which are only suitable for processing a waveform of a specific type and are used only in certain communication standards and protocols. Accordingly, if the type of a waveform used for communications, standards and/or protocols are/is modified, the hardware and/or software of the specific-purpose components of the communication system should be upgraded correspondingly, while the general-purpose components can remain unchanged.

A second portion 352 of the distributed modulator 350 of the system 30 is a generic portion. The generic portion 352 may include only "general-purpose" components, that perform only common signal processing operations for most of communication standards and protocols. These common signal processing operations should not be bound to the type of the waveform used for modulation. Accordingly, general-purpose components are not expected to become outdated during an in-orbit satellite's expected lifetime.

The split between the generic and specific portions can, for example, be chosen such that the compression complexity of the intermediate information rate between the specific portion and the generic portion is minimized.

According to an embodiment of the present invention, the specific portion 351 and the generic portion 352 can be separated from each other by conveying the intermediate information via another set of modulator and demodulator operations over a communication channel.

In particular, FIG. 3 illustrates an example of separation of the specific portion 351 from the generic portion 352 by using a high data rate link According to this embodiment, the system 30 includes a high data rate link modulator 310 arranged downstream of the first portion 351 of the distributed modulator carrying out only specific functions. The high data rate link modulator 310 is configured for receiving a low number of discrete values (typically bits or symbols)

from the first portion 351 of the distributed modulator carrying out only specific functions, processing these data, and generating an uplink signal.

The system 30 also includes a distributed regenerative repeater 320 arranged at a satellite 32 and configured for generating a downlink signal. The downlink is received by a receiver 330 arranged at a user terminal 33.

According to the embodiment shown in FIG. 3, the distributed regenerative repeater 320 includes at the communications satellite such components of the conventional regenerative repeater (220 in FIG. 2) as an input multiplexer (IMUX) 323 configured to split the uplink signal into several sub-bands (channels) and a frequency down-converter 321 configured to down-convert the uplink signal to an intermediate frequency (IF). As shown in FIG. 3, the frequency down-converter 321 is arranged downstream of the IMUX 323. However, when desired, the frequency down-converter 321 can be arranged upstream of the IMUX 323.

As shown in FIG. 3, the distributed regenerative repeater 320 also includes (for each channel) a high data rate link demodulator 329 arranged downstream of the frequency down-converter 321. The high data rate link demodulator 329 demodulates the IF signal and switches it to baseband.

It should be noted that in some embodiments of the present invention, a DVB-S2/S2X link (using high order modulations) can be used instead of the high data rate link as a high speed link, between the specific purpose portion 351 and general purpose portion 352. In this case, a corresponding modulator has to be used as the High Data Rate Link Modulator 322 at the gateway 31 and a DVB-S2/S2X demodulator as the High Data Rate Demodulator 329 at the satellite 32.

According to further embodiments of the present invention, an optical link can be used instead of the high data rate link as a high speed link with a corresponding modulator as the high data rate modulator at the gateway 31 and an optical demodulator as the high data rate demodulator at the satellite 32.

The pulses generated by the high speed link demodulator (e.g., the high data rate link demodulator or by the DVB-S2/S2X link demodulator) are then further processed into a downlink carrier signal by a second portion 352 of the distributed modulator 350.

As described above, the distributed modulator 350 includes the two portions 351 and 352 of components, which apply two different kinds of modulation functions to the information data provided for transmission by the system 30 for satellite payload communications. The first (specific) portion 351 of components of the distributed modulator 350 are "specific-purpose" components, and these components are all arranged at the gateway 31 upstream of the high data rate link modulator 310. These specific-purpose components perform specific signal processing operations, which are only suitable for processing a waveform of a specific type, and are different for each specific communication standard and protocol. Accordingly, if the type of a waveform used for communications, standards and/or protocols are/is modified, the hardware and/or software of the specific-purpose components of the communication system can be upgraded correspondingly. Since the specific-purpose components are located on the ground, they can be easily maintained and upgraded, when required, to meet evolution and developments in hardware and software engineering for communication techniques.

The second portion 352 of components of the distributed modulator 350 comprise only "general-purpose" components, which are all arranged on the satellite 320. These general-purpose components perform only signal processing operations which are common to all communication standards and protocols. These common signal processing operations should not be bound to the type of the waveform used for modulation. Accordingly, general-purpose components are not expected to become outdated during an in-orbit satellite's expected lifetime.

It should be understood that the general-purpose components can be implemented as electronic hardware, digital signal processing software or combinations of both, e.g., ASICs (application-specific integrated circuits) with embedded DSP (Digital signal processing). Moreover, the generic portion can be implemented by a combination of programmable and configurable hardware and software (typically called "software defined radio" or SDR).

Presence of software defined components can provide flexibility to the payload, since, when desired, the software components can be reconfigurable and/or upgraded from the ground. To clearly illustrate this interchangeability of hardware and software, various components, blocks, and modules, are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

According to an embodiment of the present invention, the first portion 351 with "specific-purpose" components of the distributed regenerative repeater 320 applies "specific-purpose" modulation functions to the information data carried by the uplink signal at the gateway. On the other hand, the second portion 352 with "general-purpose" components applies "general-purpose" modulation functions to the information data after demodulation by the high data rate link demodulator 329 on board of the satellite. Examples of "general-purpose" components and "specific-purpose" components will be shown hereinbelow.

Accordingly, an uplink signal is remodulated by the general-purpose components of the second portion 352 of the distributed modulator 350 into a downlink information signal, and then up-converted by a frequency up-converter 325 that is arranged downstream of the second portion 352 of the distributed modulator 350. The frequency up-converter 325 mixes the intermediate frequency with a higher frequency, to produce a final frequency of the downlink signal, which carries the modulated information data. The up-converted signal is then amplified by a high-power amplifier 326, before retransmission to the receiving user terminal 33. An example of the high-power amplifier 326 suitable for the invention includes, but is not limited to, a Traveling Wave Tube Amplifier (TWTA).

The amplified carriers from a group of channels are then recombined in an output multiplexer (OMUX) 327 to generate a single combined signal. The combined signal is then sent to a downlink antenna 328 for retransmission as a down-link signal to the receiver 330 of the user terminal 33. The term "user terminal" herein refers to any communication equipment that conforms to industry standard interfaces, including PCs smart TVs, ATM switches, IP routers, etc.

According to an example of the present invention, a link between the specific-purpose components performed at the gateway (terrestrial part) and the general-purpose components (performed at the satellite), is a highly spectrally efficient link e.g. a link based on the existing DVB-S2 and/or DVB-S2X (Digital Video Broadcast S2 Extensions) standards for satellite-based video transmission using high order modulations and high rate coding. The DVB-S2X and DVB-S2X standards are described in the specifications ETSI EN 302 307-1 and ETSI EN 302 307-2, correspondingly. The operations performed by DVB-S2 and DVB-S2X are known per se, and therefore are not expounded hereinbelow in detail.

Figure 4:
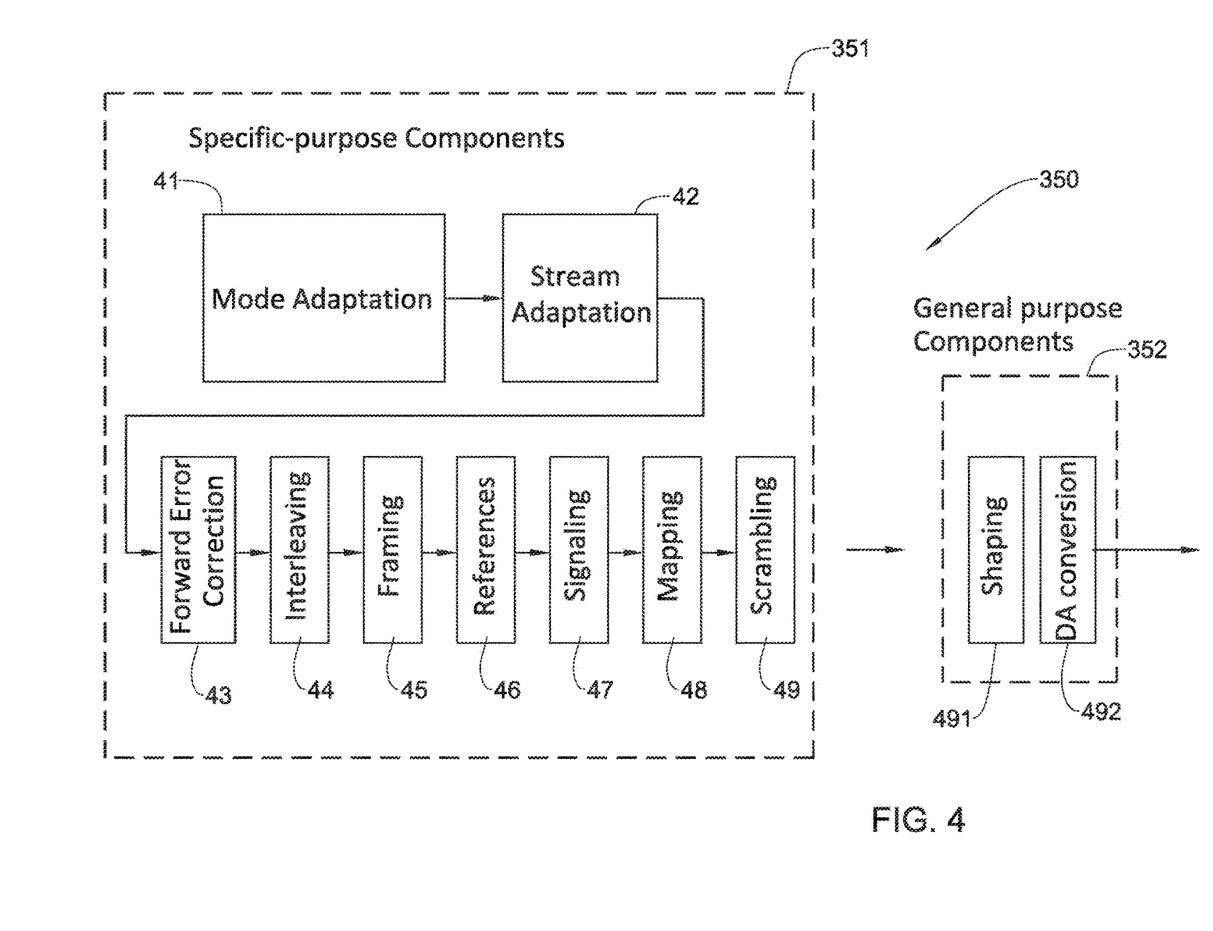
FIG. 4 illustrates an embodiment of the distributed modulator of the system shown in FIG. 3, which is implemented to operate on the basis of DVB-S2X.

Further description is provided with reference to FIG. 3 and to FIG. 4 that illustrate an embodiment of the distributed modulator 350 implemented to operate on the basis of DVB-S2X. According to this embodiment, the first portion 351 of the distributed modulator 350 based on DVB-S2X includes the specific-purpose components 41 through 48 that provide mode adaptation (component 41), stream adaptation (component 42), forward error correction (FEC) encoding (component 43), interleaving (bits and symbols) (component 44), framing (component 45), providing references (component 46) by pilot signals, header signaling (component 47), mapping (k bits to one of $2^k$ constellation points) (component 48), and scrambling (component 49). The specific-purpose components 41 through 49 of the distributed modulator 350 are arranged at the gateway (31 in FIG. 3), which is located on the ground. Accordingly, these components can be easily maintained, replaced and upgraded, when required.

On the other hand, the second portion 352 of the distributed modulator 350 based on DVB-S2X includes the general-purpose components 491 and 492 that provide shaping of the information signal and then D/A converting of the shaped signal, correspondingly. The general-purpose components 491 and 492 of the second portion 352 of the distributed modulator 350 are arranged on the satellite 320 as part of the entire regenerative payload. It should be understood that the entire regenerative payload also includes such general purpose elements as (IMUX) 323, the frequency down-converter 321 and the high data rate link demodulator 329, which are arranged upstream of the second part 352, and such general purpose elements as the frequency up-converter 325, the high-power amplifier 326 and the output multiplexer (OMUX) 327, which are arranged downstream of the second portion 352 of the distributed modulator 350. When desired, the general purpose components can be remotely configured to match new waveform requirements, however they do not have to be totally replaced.

According to this embodiment, the split point between the specific and generic portions is chosen in the place where channel symbols are created. Accordingly, for each frame of the DVB-S2x standard, the information needed to be conveyed to the generic portion is the modcod number (8 bits number) plus $\log_2(M)$ bits per information symbol, where M is the modulation order (4 for QPSK, 8 for 8PSK, 16 for 16APSK, etc.). The generic portion can rebuild the entire frame based on this information, if the constellation tables (which are fixed for DVB-S2x) have already been conveyed to the satellite at a system setup.

According to another example of the present invention, a the specific-purpose components performed at the gateway (terrestrial part), the general-purpose components (performed at the satellite), and a link between them implements the Protected Tactical Waveform (PTW) scheme that is used to support protected tactical systems.

Figure 5:
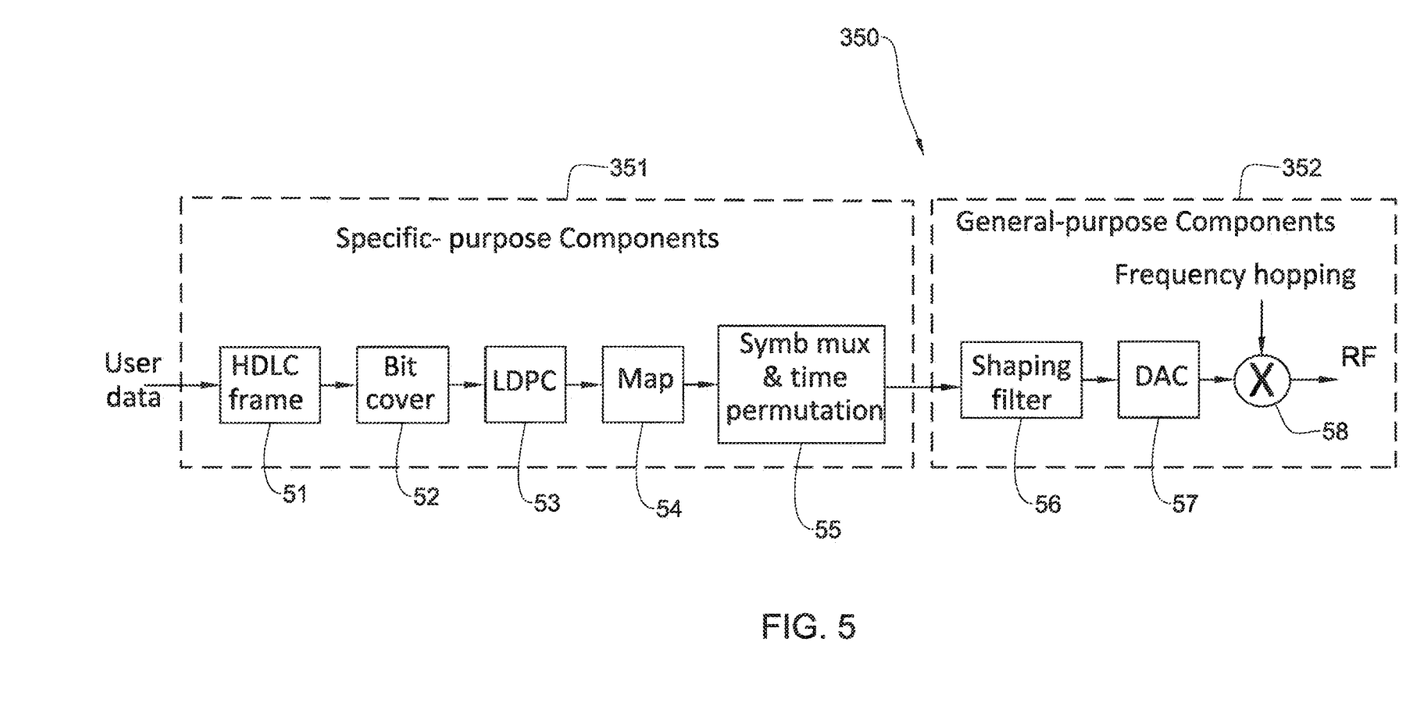
FIG. 5 illustrates an embodiment of the distributed modulator of the system shown in FIG. 3, which is implemented to operate on the basis of a PTW scheme.

FIG. 5 illustrates an embodiment of the distributed modulator 350 implemented to operate on the basis of the PTW scheme. According to this embodiment, the first portion 351 of the distributed modulator 350 based on PTW scheme includes specific-purpose components 51 through 55 that correspondingly provide High-Level Data Control (HDLC) framing (component 51), bit covering (component 52), low-density parity-check (LDPC) (component 53), mapping (component 54), Symbol MUX and time permutations (component 54). These operations performed by the PTW scheme are known per se, and therefore are not expounded hereinbelow in detail. According to the present invention, these specific-purpose components can be arranged at the gateway.

On the other hand, the second portion 352 of the distributed modulator 350 based on the PTW scheme, includes general-purpose components 56 through 58 that provide shaping of the information data signal, D/A converting of the shaped signal and then up-frequency converting, correspondingly. The general-purpose components 56 through 58 of the second portion 352 of the distributed modulator 350 are arranged on the satellite (not shown) as a part of the entire regenerative payload.

According to this embodiment, the split point between the specific and generic portions is chosen in the place where channel symbols are created. Accordingly, for each frame of the PTW standard, the information needed to be conveyed to the generic portion is the modcod number plus $\log_2(M)$ bits per information symbol, where M is the modulation order (4 for QPSK, 8 for 8PSK, 16 for 16APSK etc.). The generic portion can rebuild the entire frame based on this information if the constellation tables (which are fixed for PTW) have already been conveyed to the satellite at a system setup.

It should be understood that similar to the example shown in FIG. 3 for DVB-S2X, the entire regenerative payload, based on PTW, also includes such general purpose elements as (IMUX), the frequency down-converter and the high data rate demodulator, which are arranged upstream of the second portion 352 of the distributed modulator 350, and such general purpose elements as the high-power amplifier and the output multiplexer (OMUX), which are arranged downstream of the second portion 352.

Figure 6:
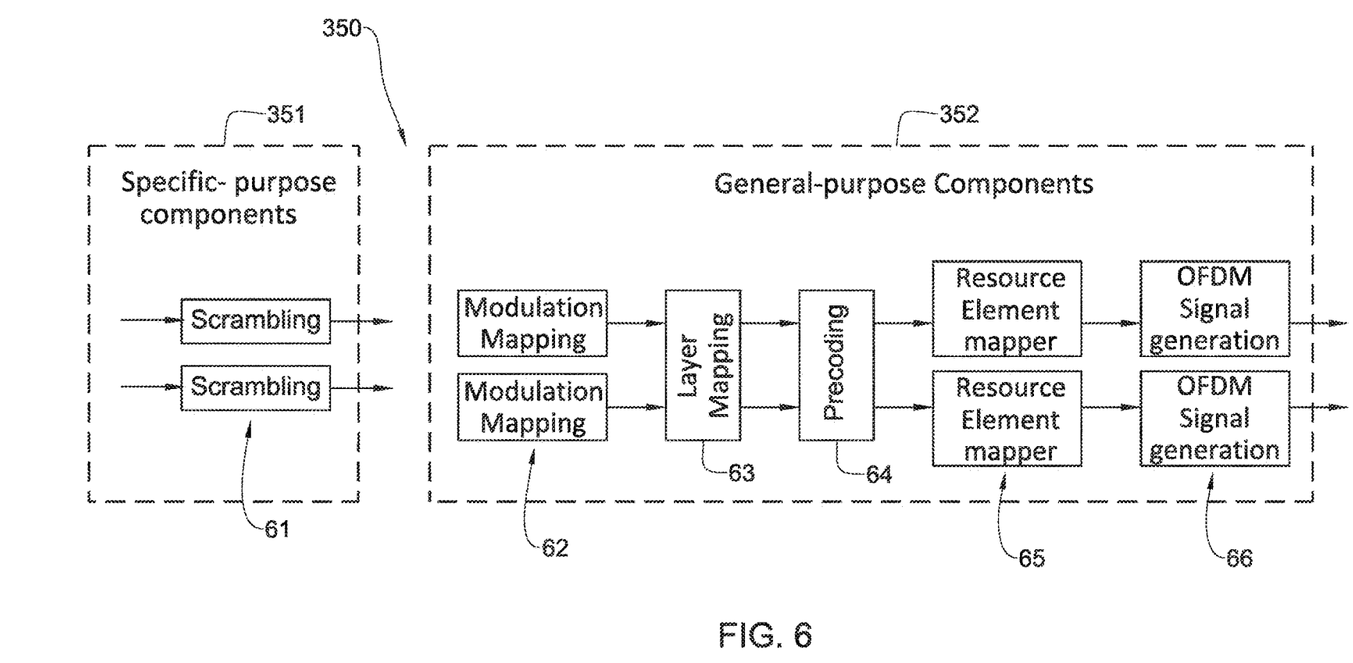
FIG. 6 illustrates a general block scheme of an uplink physical channel processing in a LTE scheme.

According to a further example of the present invention, the specific-purpose components performed at the gateway (terrestrial part), the general-purpose components (performed at the satellite), and a link between them implements the Long Term Evolution (LTE) physical layer with a downlink shared channel (DL) used in broadband mobile communications. According to this example, the distributed modulator 350 is based on an OFDM modulator used in LTE.

FIG. 6 illustrates a general block scheme of an uplink physical channel processing in the LTE scheme. In this case, the baseband signal, representing the physical uplink shared channel, is defined in terms of the following steps: scrambling (component 61), modulation mapping (component 62) of scrambled bits to generate complex-valued symbols, layer mapping (component 63) of the complex-valued modulation symbols onto one or several transmission layers, transform precoding (component 64) to generate complex-valued symbols precoding of the complex-valued symbols, mapping (component 65) of precoded complex-valued symbols to resource elements, and generation (component 66) of a complex-valued time-domain OFDMA signal for each antenna port. The operations performed by the LTE scheme are described, for example, in the 3GPP TS 36.201 specification and in other related specifications, and are known per se, and therefore are not expounded hereinbelow in detail.

According to an embodiment of the present invention, the first portion 351 of the distributed modulator 350 based on LTE DL (that can be arranged at the gateway) includes the specific-purpose component 61 that provides scrambling, while the second portion 352 of the distributed modulator 350 based on LTE DL (mounted on the satellite) includes the general-purpose components 62 through 66 that provide modulation mapping, layer mapping, precoding, resource element mapping, and OFDMA generation, correspondingly.

According to this embodiment, the split point between the specific and generic portions is chosen after the scrambling operation in the place where scrambled bits are generated and can be easily conveyed to the generic portion. The main modules of the generic portion, such as modulation mapping, layer mapping, precoding and resource element mapping are implemented via look up tables, while the OFDM signal generation is done by inverse FFT and cyclic prefix insertion. It should be noted that the look up tables are needed also to be conveyed to the generic portion from time to time.

Figure 7:
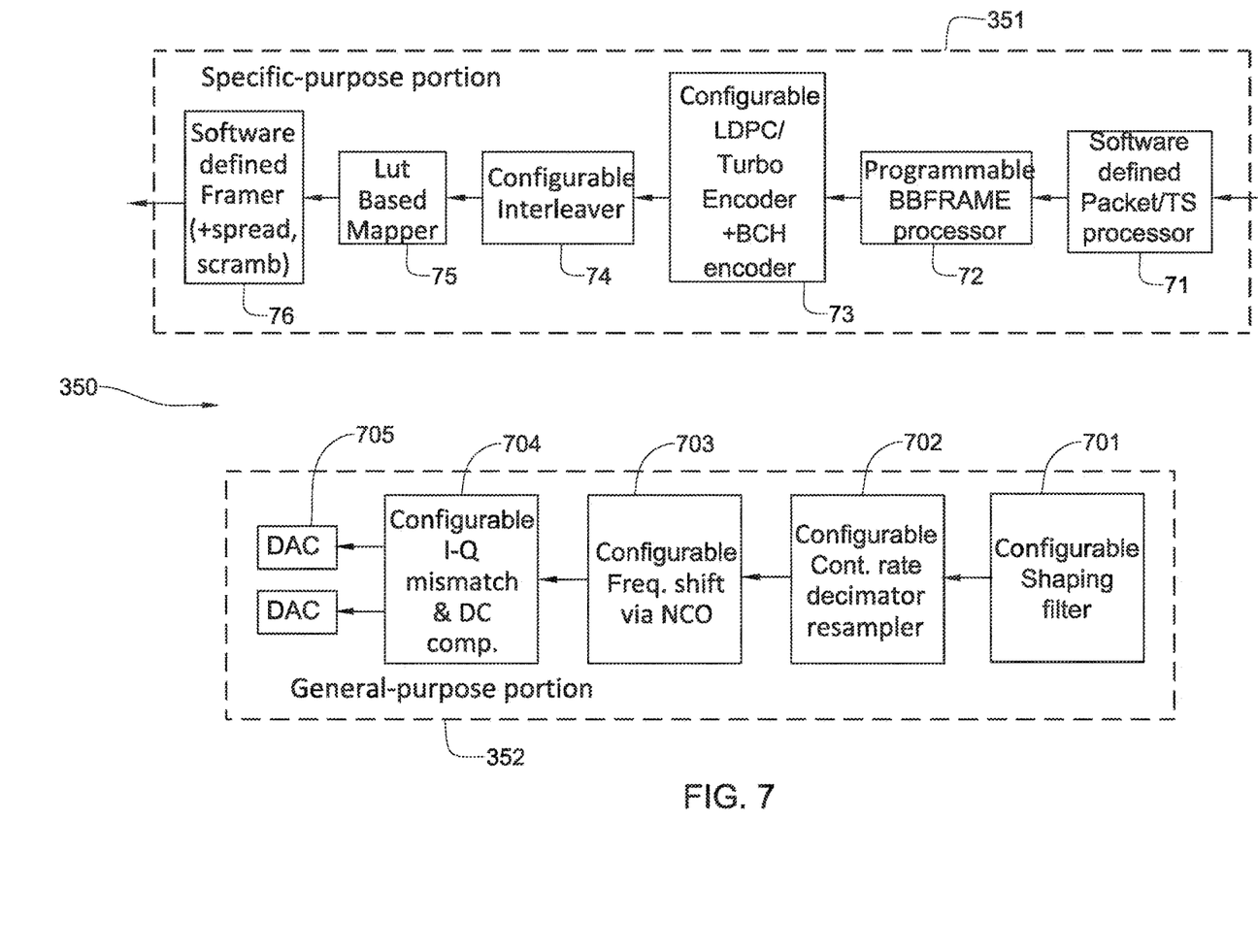
FIG. 7 illustrates a general block scheme of an uplink physical channel processing in a Software Defined Radio (SDR) system based on SatixFy's SX-3000 SoC baseband chip.

FIG. 7 illustrates a general block scheme of an example of an uplink physical channel processing in a Software Defined Radio (SDR) system based on SatixFy's SX-3000 Application Specific Integrated Circuit (ASIC). The SX-3000 ASIC is an example of a reconfigurable hardware that can be used for both the specific- and general-purpose components of the distributed modulator 350.

According to this embodiment, the first portion 351 of the distributed modulator 350 includes the following specific-purpose components of the SX-3000 ASIC that can be used for a chip arranged on the ground: a software defined packet/TS processor 71, a programable BBFRAME processor 72, a configurable LDPC/Turbo Encoder associated with BCH Encoder 73, a configurable interleaver 74, a LUT based mapper 75, and a software defined framer associated with a spread scrambler 76.

The packet/TS processor 71 is configured to receive the information packets or Transport Stream (TS) packets (a format that is used for video transmission), and to organize them. The BBFRAME processor 72 is configured to build the baseband frame, which is the frame of bits to be transmitted, which comprises of the information data bits and control bits. The LDPC (low-density parity-check)/Turbo Encoder associated with a BCH (Bose-Chaudhuri-Hocquenghem) Encoder 73 is configured to encode the data with a Forward Error Correction code by adding redundancy bits. The interleaver 74 is configured to change the order of the bits. The mapper 75 is configured to map the bits into symbols. Each symbol represents several bits. It should be noted that symbols are represented by a complex number (I and Q pair), which represent the amplitude and phase of the signal to be transmitted. The framer associated with the spread scrambler 76 is configured to arrange the symbols into frames adding additional symbols for control and synchronization purposes and to scramble the data by multiplying the symbols by a pseudo-random complex sequence. It should be noted that when desired, the scrambling can also be performed at the general-purpose portion 352 of distributed modulator 350.

According to this embodiment, the stream of symbols (or some presentation of the symbols) are transmitted by the High Data Rate Link Modulator (310 in FIG. 3) to the payload on the satellite (not shown). The payload can be implemented by using a similar chip SX-3000.

As an example, if a DVB-S2/S2x modem is needed to be split, a suitable place to split the components of the SX-3000 ASIC would be just before a shaping filter that is configured to shape the signal for the required waveform. Accordingly, the following components of the SX-3000 ASIC can be used as general-purpose components: the shaping filter 701, a continuously variable rate decimator re-sampler 702, a frequency shifter 703, an I/Q mismatch and DC offset compensatoror 704, and Digital to Analog Converters (DAC) 705.

The continuously variable rate decimator re-sampler 702 is configured to increase the sampling rate of the signal to a desired value. The frequency shifter 703 is configured to shift the signal central frequency (via Numerically Controlled Oscillator (NCO), when required. The I/Q mismatch and DC offset compensator 704 is configured to correct the errors in the bias (DC) and alignments of the I and Q signals. The DACs 705 are configured to convert the signal into an analog form.

Additional data that needs to be conveyed is modcod (Modulation and Coding), whenever the modcod and the look-up-table (LUT) for modcods parameters (one time transmission) are changed.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be noted that for the sake of simplicity, operation of the system 30 is described hereinabove in a single direction transmission path from the gateway 31 to the user terminal 33, which is known in the art as the forward link. It should be understood that when desired, a backward (i.e., return) link may also be implemented, since it is based on the same principles, mutatis mutandis.

In particular, to provide a backward link the system may be further configured for receiving a downlink signal from the communications satellite to the gateway. The downlink signal can be indicative of information data carried by an uplink signal received at the communications satellite from the user terminal. In this case, the system further includes a high data rate link communication demodulator (not shown in FIG. 3) arranged at the gateway upstream of the first portion of components, which should be configured for receiving a downlink signal from the satellite in the backward link.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A system for regenerative satellite communications between a gateway of a terrestrial communication network and a user terminal via a communications satellite for transmitting a downlink signal in a forward link from the communications satellite to the user terminal, said downlink signal being indicative of information data carried by an uplink signal received at the communications satellite from the gateway, the system comprising:
- a distributed regenerative modulator including:
  - first modulator components arranged at the gateway, and
  - second modulator components arranged at the communications satellite;
- wherein the first modulator components apply a first part of modulation functions according to a first modulation scheme to the information data at the gateway to generate channel symbols,
- while the second modulator components apply a second part of modulation functions to the channel symbols at the satellite to generate said down-link signal for transmitting to the user terminal,
- wherein said first components of said distributed regenerative modulator perform specific signal processing operations, which are only suitable for processing a waveform of said first modulation scheme, and
- wherein said second components of said distributed regenerative modulator perform only general signal processing operations which do not depend on said waveform of said first modulation scheme;
- wherein an uplink channel between the gateway and the satellite and a downlink channel between the satellite and the user terminal are non-symmetric,
- the system further comprising:
- a link communication modulator arranged at the gateway downstream of said first components, and configured for generating said uplink signal from said channel symbols by modulating the channel symbols according to a second modulation scheme;
- a link communication demodulator arranged at the satellite to demodulate, according to said second modulation scheme, the uplink signal to provide said channel symbols,
- wherein said second components of said distributed regenerative modulator are arranged downstream of said link communication; demodulator and are configured to generate said downlink signal from said channel symbols.

2. The system for regenerative satellite communications of claim 1, wherein a split of said distributed regenerative modulator into the first modulator components and the second modulator components is such that the complexity of compressing an intermediate information rate between the first and the second components is minimized.

3. The system for regenerative satellite communications of claim 1, wherein the first components and the second components of said distributed regenerative modulator are separated from each other by conveying intermediate information via system components performing predetermined operations over a communication channel.

4. The system for regenerative satellite communications of claim 1, wherein said second components of said distributed regenerative modulator are implemented by a combination of a configurable hardware and software.

5. The system for regenerative satellite communications of claim 1, further configured for receiving a backward link downlink signal in a backward link from the communications satellite to the gateway, said backward link downlink signal being indicative of backward link information data carried by a backward link uplink signal received at the communications satellite from the user terminal, the system further comprising a gateway link communication demodulator arranged at the gateway upstream, in a backward link direction, of said first modulator components, and is configured for receiving said backward link downlink signal from the satellite in the backward link.

6. The system for regenerative satellite communications of claim 5, wherein said second components of said distributed regenerative modulator are arranged upstream, in said backward link direction, of said gateway link communication demodulator.

7. The system for regenerative satellite communications of claim 6, wherein said second components of said distributed regenerative modulator are arranged upstream, in a backward link direction, of said gateway link communication demodulator.

8. The system for regenerative satellite communications of claim 1, being a multichannel system and further comprising at the satellite:
- an input multiplexer (IMUX) configured to split the uplink signal into several sub-bands; and
- an output multiplexer (OMUX) configured for recombining amplified carriers from a group of channels into the downlink signal.

9. The system for regenerative satellite communications of claim 1, wherein:
- the first modulator components provide operations based on a DVB-S2 standard and/or DVB-S2X standard, wherein said operations include: mode adaptation, stream adaptation, forward error correction (FEC) encoding, interleaving bits and symbols, framing, providing references by pilot signals, header signaling, mapping k bits to one of $2^k$ constellation points, and scrambling; and
- the second modulator components provide signal shaping.

10. The system for regenerative satellite communications of claim 1, wherein said first modulation scheme is different to said second modulation scheme.

11. The system for regenerative satellite communications of claim 10, wherein said first components are configured to generate a baseband frequency signal comprising said channel symbols.

12. The system for regenerative satellite communications of claim 11, wherein said link communication modulator modulates said baseband signal comprising said channel symbols to an intermediate frequency (IF) signal having higher frequency than a frequency of said baseband signal.

13. The system for regenerative satellite communications of claim 12,
- wherein said link communication demodulator is configured to demodulate a received intermediate frequency signal, and produce a baseband signal having a lower frequency than said intermediate frequency signal and comprising said channel symbols.

14. The system for regenerative satellite communications of claim 13, wherein said gateway comprises transmission circuitry, downstream of said link communication modulator, and configured to up-convert said IF signal to a higher frequency to generate said uplink signal; and
- said satellite comprises receiver circuitry configured to down-convert said uplink signal to provide said received intermediate frequency signal to said link communication demodulator.

15. The system for regenerative satellite communications of claim 13, wherein said second modulator components modulate said baseband signal comprising said channel symbols to a signal having higher frequency than said baseband signal.

16. The system for regenerative satellite communications of claim 10, wherein said uplink signal has a higher data rate than said downlink signal.

17. The system for regenerative satellite communications of claim 16, wherein said link communication modulator is configured to modulate a received signal to a first signal having a first data rate and to provide said first signal to said uplink channel;
wherein said second modulator components are configured to modulate a received signal to a second signal having a second data rate which is different to said first data rate, and to provide said second signal to said downlink channel.

18. The system for regenerative satellite communications of claim 17, wherein said first data rate is higher than said second data rate.

19. A method for regenerative satellite communications between a gateway of a terrestrial communication network and a user terminal via a communications satellite for transmitting a downlink signal in a forward link from the communications satellite to the user terminal, said downlink signal being indicative of information data carried by an uplink signal received at the communications satellite from the gateway, comprising:
providing a distributed modulator including a first components arranged at the gateway and a second components arranged at the communications satellite;
performing a first part of modulation functions according to a first modulation scheme, by the first components of the distributed modulator, on the information data, at the gateway, to generate channel symbols;
performing a second part of modulation functions, by the second components of the distributed modulator, on the uplink signal, at the satellite, to generate said down-link signal,
wherein said first part of modulation functions include only specific signal processing operations, which are only suitable for processing a waveform of a specific type according to said first modulation scheme, and wherein said second part of modulation functions includes only general signal processing operations which do not depend on the waveform used for modulation;
wherein an uplink channel and a downlink channel are non-symmetric,
the method further comprising:
generating said uplink signal by a link communication modulator arranged at the gateway downstream of said first components and configured for generating said uplink signal from said channel symbols by modulating the channel symbols according to a second modulation scheme which is different to said first modulation scheme;
demodulating said uplink signal, according to said second modulation scheme, to provide said channel symbols, said demodulating performed by link demodulator arranged at the satellite, and upstream of said second components of said distributed modulator.

20. The method of claim 19, further comprising:
splitting the uplink signal into several sub-bands by an input multiplexer (IMUX); and
recombining amplified carriers from a group of sub-bands into the downlink signal by an output multiplexer (OMUX).

21. The method of claim 19, further comprising:
providing a gateway link communication demodulator arranged at the gateway, and configured for receiving a backward link downlink signal from the satellite in a backward link; and
receiving a backward link downlink signal in a backward link from the communications satellite to the gateway, said backward link downlink signal being indicative of information data carried by a backward link uplink signal received at the communications satellite from the user terminal.

* * * * *